United States Patent [19]

Bezvulyak et al.

[11] 4,176,952

[45] Dec. 4, 1979

[54] PHOTOELECTRIC PYROMETER FOR MEASURING TEMPERATURE OF BODIES OF SMALL CROSS-SECTIONAL DIMENSIONS WHICH VARY WITH RESPECT TO OPTICAL AXIS OF PYROMETER

[75] Inventors: Anatoly S. Bezvulyak; Ilya M. Gelfand; Efim M. Torchinsky; Sergei B. Pushkin; Rudolf K. Vedernikov; Gennady P. Kulachenkov, all of Magnitogorsk Chelyabinskoi; Petr F. Tkachuk, Kolomnya Ivano-Frankovskoi; Viktor F. Karyagin, Magnitogorsk Chelyabinskoi, all of U.S.S.R.

[73] Assignee: Vsesojuznynauchno-Issledovatelsky Institut Metlznol Promyshlennosti (Vniimetiz), U.S.S.R.

[21] Appl. No.: 892,091

[22] Filed: Mar. 31, 1978

[51] Int. Cl.² .......................... G01J 5/52; G01J 5/62
[52] U.S. Cl. ......................................... 356/47; 356/48
[58] Field of Search .......................... 356/43, 46–50; 73/344, 355 R

[56] References Cited
U.S. PATENT DOCUMENTS

| 2,968,946 | 1/1961 | Goldberg et al. | 356/47 |
| 3,482,448 | 12/1969 | Gaffard | 356/43 |

FOREIGN PATENT DOCUMENTS 566148 9/1977 U.S.S.R. .................................... 356/48

OTHER PUBLICATIONS

Foley, G. M., "High Speed Optical Pyrometer", Review of Scientific Instruments, vol. 41, 6-1970, pp. 827-834.

Primary Examiner—John K. Corbin
Assistant Examiner—Wm. H. Punter
Attorney, Agent, or Firm—Steinberg and Blake

[57] ABSTRACT

Disclosure is made of a photoelectric pyrometer for measuring the temperature of bodies of small cross-sectional dimensions which vary with respect to the optical axis of the pyrometer. The pyrometer comprises, in successive arrangement, an objective, a stationary field diaphragm, a slit obturator, an aperture diaphragm, a condenser sighted at the aperture of the stationary field diaphragm, and a photoelectric converter arranged in the sharp image plane of the condenser. The light-sensitive surface of the photoelectric converter receives two trains of light pulses. One of these pulse trains is formed by the above-mentioned units, whereas the other is formed by the obturator arranged across the path of a luminous flux generated by an optical feedback radiation source. The photoelectric converter produces two trains of trapezoidal electric pulses of a variable duration and on-off ratio. For accurate measurement of the amplitude of these pulses, provision is made for a device whose purpose is to convert the amplified electric pulses into square pulses of a fixed duration and an amplitude equal to that in the middles of the amplified electric pulses. The device has its input connected to an output of an amplifier, whereas outputs of the device are connected to inputs of a storage and comparison device.

1 Claim, 4 Drawing Figures

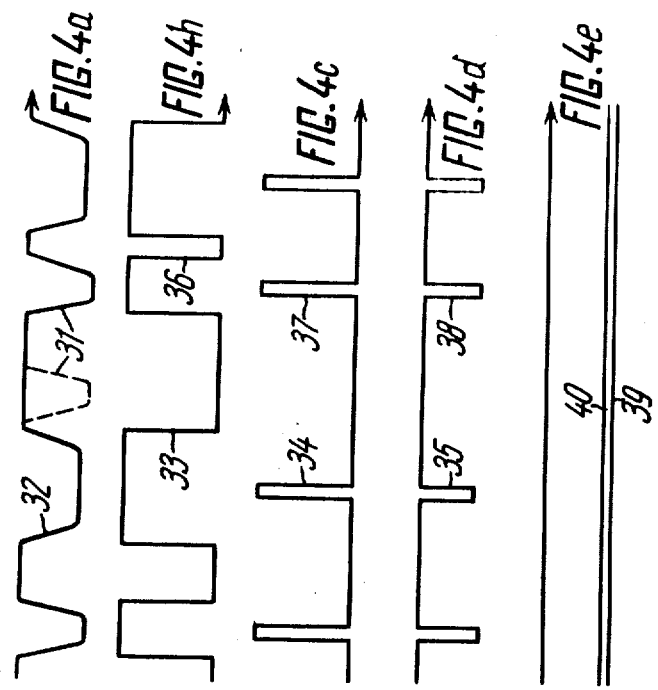
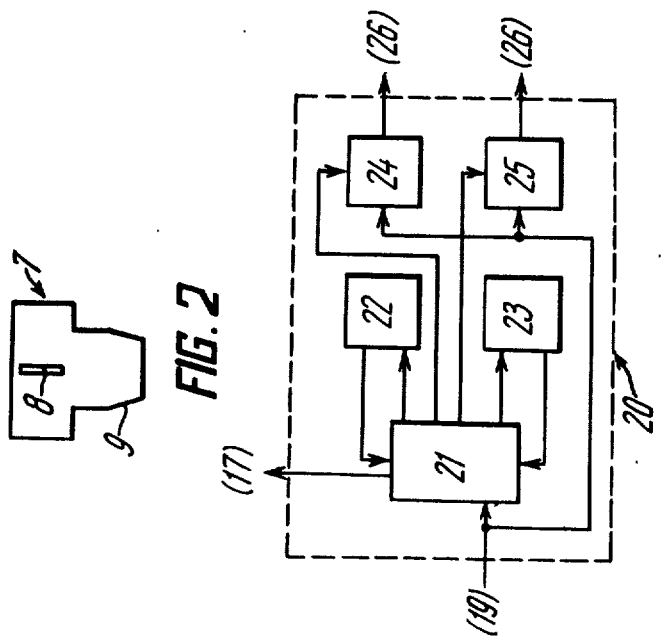

PHOTOELECTRIC PYROMETER FOR MEASURING TEMPERATURE OF BODIES OF SMALL CROSS-SECTIONAL DIMENSIONS WHICH VARY WITH RESPECT TO OPTICAL AXIS OF PYROMETER

FIELD OF THE INVENTION

The present invention relates to photoelectric pyrometers and, more specifically, to photoelectric pyrometers for measuring the temperature of moving bodies of small cross-sectional dimensions which vary with respect to the optical axis of the pyrometer.

The invention is advantageous for temperature measurement and recording. The pyrometer of this invention can be used as a fast-response temperature transducer in automatic control systems employed, for example, in the manufacture of sorbitized rolled wire, and in such processes as annealing and patenting carbon steel wire in the form of uncoiled filament, and hot drawing of wire manufactured from hard grades of steel, for example, high-chromiun steel. The pyrometer according to the invention can also be used in induction heaters; it can be used, for example, as a means for measuring and adjusting the heating temperature in hot stamping machines for manufacturing nuts and bolts.

Finally, one can use a scanning version of the pyrometer in accordance with the invention to study temperature fields extending over large surfaces.

BACKGROUND OF THE INVENTION

There are known photoelectric pyrometers for measuring temperatures of stationary and moving elongated bodies of small cross-sectional dimensions (cf. A. I. Gordov, "Osnovy pyrometrii"/"Principles of Pyrometry"/, metallurgia Pulblishers, Moscow, 1964, pp. 352-353).

In such pyrometers, the light-sensitive surface of a photoelectric converter, arranged in the sharp-image plane of an objective, receives one (direct amplification) or two (comparison with optical feedback) trains of light pulses. In the former case, the single train of light pulses is produced as a luminous flux passes from a heated body through an objective with a diaphragm, an obturator, and a condenser with a diaphragm. In the latter case (comparison with optical feedback), the second train of light pulses is produced by the same obturator arranged across the path of a luminous flux generated by an optical feedback radiation source.

The photoelectric converter produces trains of electric pulses shaped as a distorted sinusoid; these pulses are applied to an amplifier; the amplification may be either direct or determined by the results of a comparison with optical feedback data. In order to use pyrometers of the type under review for measuring temperatures of vibrating bodies of small cross-sectional dimensions, the geometrical dimensions of the light-sensitive layer of the photoelectric converter must be several times less than those of the image of the body whose temperature is measured; as a result, one must use photoelectric converters with light-sensitive surfaces of a small area, as well as long focal length telephoto lenses.

There is further known a photoelectric pyrometer for measuring temperatures of bodies of small cross-sectional dimensions which vary with respect to the optical axis of the pyrometer. The photosensitive surface of this type of pyrometer receives two trains of light pulses. The first train of pulses is produced as a radiation flux passes from a heated body through an objective with a stationary field diaphragm, a slit obturator, and a condenser with an aperture diaphragm. The second train of pulses is produced by the same obturator arranged across the path of a luminous flux generated by an optical feedback radiation source. The two trains of light pulses are converted into two trains of initial electric pulses applied to an amplifier which is electrically coupled to a storage and comparison device electrically connected, in turn, to the optical feedback radiation source and a secondary recording instrument (cf. USRR Inventor's Certificate No. 185,513, Cl. G 01 j 5/28).

In this type of pyrometer, the luminous flux passes from the heated body through the objective with the stationary diaphragm and is focused in the sharp image plane of the objective. This plane is tangential to the cylindrical surface of a rotatable drum having a narrow slit parallel with the rotation axis and the axis of the elongated body whose temperature is measured; the drum serves as an obturator. Arranged inside the drum, along its radius, are a light filter, a condenser with an aperture diaphragm, and a right-angle prism oriented so that the image of the slit, which is illuminated as it traverses the image of the heated body in the sharp image plane of the objective, is received by the light-sensitive surface of a photoelectric converter arranged outside the drum and coaxially with it. Thus the condenser trasmits, on a certain scale, the image of the illuminated rotating slit to the light-sensitive surface of the photoelectric converter, and the image traverses that light-sensitive surface.

The photoelectric converter converts the light pulses to a first train of initial electric pulses whose duration is determined by the magnification ratio of the objective-condenser optical system and the cross-sectional dimensions of the heated body.

As the drum turns through an angle of 180°, the slit traverses the image of the optical feedback radiation source placed in series with a rheochord of the comparison circuit, which image is focused by the second objective in its sharp image plane tangential to the cylindrical surface of the drum. The condenser and prism rotate together with the drum, so the image of the illuminated rotating slit, whose brightness is dependent upon the brightness of the optical feedback radiation source, is also transmitted to the light-sensitive surface of the photoelectric converter which produces a second train of initial electric pulses. The pulses of the second train are found between those of the first train.

The two trains of initial electric pulses formed by the photoelectric converter are applied to the amplifier having a feedback input, and to a converter which is, in fact, an analog storage and comparison device. The converter generates voltage which is proportional to the difference between the amplitudes of pulses of the two pulse trains. The voltage is applied to a power and voltage amplifier having two outputs of which the first is intended to transmit feedback voltage to the first amplifier, whereas the second is intended to switch on the rheochord's drive motor connected in series with a feedback lamp and a calibrated resistor. The amplifier supplies voltage to the drive motor of the rheochord until the pulse amplitudes of both trains of pulses produced by the photoelectric converter become equal.

The supply current of the optical feedback radiation source is unabbiguously identified with the temperature. The voltage drop across the calibrated resistor is measured by a secondary recording instrument which is an electronic potentiometer whose scale is graduated in degrees Celsius.

As pointed out above, the motion of the heated body with respect to the optical axis of the pyrometer is accompanied by movement of the image of the illuminated slit across the light-sensitive surface of the photoelectric converter. This accounts for measurement errors which are due to the fact that the light sensitivity of the light-sensitive surface and the rate of its ageing with time are not uniform.

If there is a change in the temperature of heated bodies of different cross-sectional dimensions, the duration of the initial electric pulses of the pulse train produced in the course of scanning of the light flux coming from the heated body is proportional to the cross-sectional dimensions of the heated body; the initial electric pulses of the pulse train produced in the course of scanning of the light flux coming from the optical feedback radiation source are of a constant duration.

As a result, there is an extra measurement error dependent upon the size of the heated body and the distance to that body. The reasons for this are as follows:

No matter what specific design is chosen for the analog storage and comparison device, this device necessarily comprises a storage capacitor; the potential at the plates of this capacitor increases exponentially with time and at infinity reaches the amplitude of the pulse applied to the capacitor; an acceptable degree of accuracy is practically ensured within a period of time of no less than $4 \div 5$ time constants of the charging circuit (with due regard for the internal resistance of the source).

The initial electric pulses are trapezoidal pulses. It must be remembered in this connection that the distance covered by a pulse curve along the x-axis is proportional to the energy of the pulse, and that the ratios between the energies of the leading and trailing edges and the total energies of pulses of different durations and equal amplitudes are different; hence, the charge levels of the capacitor of the analog device are different in such cases.

In addition, it is hard to manufacture and balance a rotatable drum with a slit, while the electronic circuit, intended to adjust the radiation source's current with the use of the electromotor-rheochord system, features a great time constant, whereby the sphere of application of the pyrometer under review is quite limited.

SUMMARY OF THE INVENTION

It is an object of the present invention to provide a photoelectric pyrometer for measuring temperatures of bodies of small cross-sectional dimensions which vary with respect to the optical axis of the pyrometer, which would measure temperatures of elongated bodies of small cross-sectional dimensions, which move or vibrate in relation to the optical axis of the pyrometer, more accurately than it has heretofore been possible, the readings of the pyrometer being independent of variations in the cross-sectional dimensions of a moving or vibrating heated body, as well as of the distance between that body and the pyrometer.

Another object of the invention is to provide a photoelectric pyrometer for measuring temperatures of bodies of small cross-sectional dimensions, vibrating with respect to the optical axis of the pyrometer, which pyrometer would have a faster response than the existing types of pyrometers, and would thus be fit for automatic temperature control systems.

The foregoing and other objects of the present invention are attained by providing a photoelectric pyrometer for measuring temperatures of bodies of small cross-sectional dimensions which vary with respect to the optical axis of the pyrometer, wherein the light-sensitive surface of a photoelectric converter receives two trains of light pulses of which the first is produced as a radiation flux passes from a heated body through an objective with a stationary field diaphragm, a slit obturator and a condensor with an aperture diaphragm, whereas the second train of light pulses is produced by the same obturator arranged across a luminous flux passing from an optical feedback radiation source, the two trains of light pulses being converted into two trains of initial electric pulses applied to an amplifier electrically coupled to a storage and comparison device electrically coupled, in turn, to the optical feedback radiation source and a secondary recording instrument, which pyrometer is characterized, according to the invention, by that the photoelectric converter is arranged in the sharp image plane of the condenser sighted at the aperture of the stationary field diaphragm, and produces two trains of initial electric pulses of a trapezoidal shape and a variable duration and on-off ratio, and by that the pyrometer further includes a device for converting the amplified intitial electric pulses into square pulses of a preset duration and amplitudes equal to those of the amplified initial electric pulses in the middle of these pulses, an input of the latter device being connected to an output of the amplifier, while outputs of the latter device are connected to inputs of the storage and comparison device.

The proposed photoelectric pyrometer is capable of measuring the temperature of wire of less than 1.0 mm in diameter, which vibrates in the transverse direction within a range of 10 to 15 diameters of that wire.

BRIEF DESCRIPTION OF THE ACCOMPANYING DRAWINGS

Other objects and advantages of the present invention will become more apparent from the following detailed description of a preferred embodiment thereof to be read in conjunction with the accompanying drawings, wherein:

FIG. 2 is a view of the obturator on the side of the objective;

FIG. 3 is a functional diagram of the device for converting amplified initial electric pulses into square pulses of a fixed duration and amplitudes equal to those of the amplified initial electric pulses in their middles, in accordance with the invention;

Figure 1:
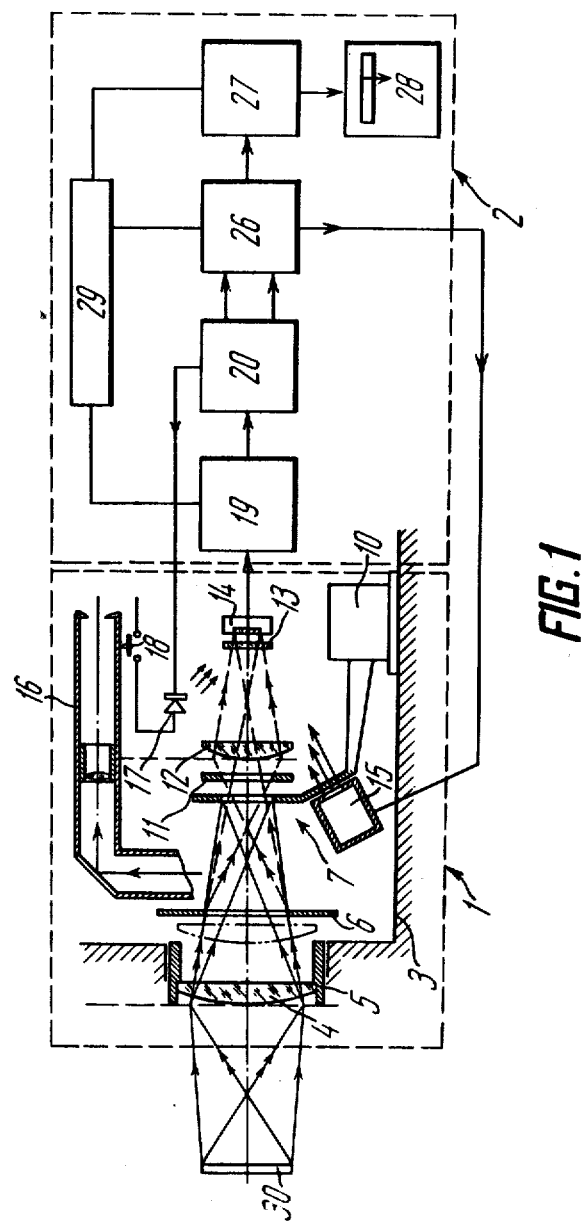
FIG. 1 is a general diagram of a photoelectric pyrometer in accordance with the invention.

FIGS. 4a, b, c, d, e are time plots of pulses produced by the basic units of the photoelectric pyrometer in accordance with the invention.

DETAILED DESCRIPTION OF THE INVENTION

The proposed photoelectric pyrometer for measuring temperatures of bodies of small cross-sectional dimensions which vary with respect to the optical axis of the pyrometer comprises an optomechanical system 1 (FIG. 1) and an electronic system 2. The optomechanical system 1 is arranged in a water-cooled housing 3 and includes, in a serial arrangement, an objective 4 secured in a movable barrel 5, a stationary field diaphragm 6, and a slit obturator 7 having a narrow slit 8 (FIG. 2) in its upper part and a leg 9 in its lower part. The slit obturator 7 is set in oscillating motion at a perpendicular to the plane of the drawing (FIG. 1); this is done by an electromechanical resonance vibrator 10. The photoelectric pyrometer of the present invention further includes a stationary aperture diaphragm 11, a condenser 12, a light filter 13, and a photoelectric converter 14 whose light-sensitive surface is matched with the sharp image plane of the condenser 12 sighted at the aperture of the stationary field diaphragm 6. The field diaphragm 6 is arranged immediately behind the objective 4, while the latter is "sighted at infinity" (shown by the double dot-and-dash line in FIG. 1). The obturator 7 is in oscillating motion and describes a surface which is tangential to the sharp image plane of the objective 4.

Arranged in front of the leg 9 (FIG. 2) of the obturator 7 (FIG. 1) is an optical feedback radiation source 15. When the leg 9 (FIG. 2) of the obturator 7 is in its extreme positions, the radiation of the source 15 is received by the light-sensitive surface of a photoelectric converter 14 (FIG. 1).

The pyrometer is sighted at an object, whose temperature is to be measured, with the aid of a view-finder 16 which is a mirror-lens periscope. As the pyrometer is sighted at a heated body, the mirror part of the periscope is introduced into the gap between the diaphragm 6 and obturator 7. Upon measuring the temperature of the heated body, the mirror part of the periscope is rotated about its axis and thus removed from the gap.

In order to check the functioning of all the components of the pyrometer prior to installation, the housing 3 accommodates a pulsed radiation source 17 whose luminous flux is directed at the light-sensitive surface of the photoelectric converter 14. The pulsed radiation source 17 is switched on by pressing a button 18.

The electronic system 2 comprises an amplifier 19 of the generally known type, whose input is connected to an output of the photoelectric converter 14, whereas its output is connected to an input of a device 20 intended to convert amplified initial electric pulses into square pulses of a fixed duration and amplitudes equal to those of the amplified initial electric pulses in their middles.

The device 20 comprises, in turn, a synchronization and control unit 21 (FIG. 3). First outputs of the unit 21 are connected to a division unit 22 and a unit 23 for forming gate pulses, respectively. Outputs of the units 22 and 23 are connected to inputs of the unit 21. Second outputs of the unit 21 are connected to control inputs of tap chauging devices 24 and 25, respectively; one more output of the synchronization and control unit 21 is connected to the pulsed radiation source 17. One of inputs of the synchronization and control unit 21 and other inputs of the tap changing devices 24 and 25 are connected to the output of the amplifier 19. Outputs of the tap switching devices 24 and 25 are connected to respective inputs of an analog storage and comparison device 26 (FIG. 1) at whose output there are arranged voltage and power amplifiers of the widely known type.

Outputs of the analog storage and comparison device 26 are connected to the optical feedback radiation source 15 and a level converter 27 whose output is connected to a secondary recording instrument 28.

The electronic system 2 further includes a switch 29 connected to the amplifier 19, the analog storage and comparison device 26 and the level converter 27.

The switch 29 has two positions; the first position corresponds to the mode of measuring temperatures with optical feedback (further referred to as mode I); the second position of the switch 29 corresponds to the mode of measuring temperatures without optical feedback (further referred to as mode II).

The photoelectric pyrometer of the present invention operates as follows. First, consider mode I.

A sharp image of a heated body 30 (FIG. 1) is focused by the objective 4 in the sharp image plane. The slit 8 (FIG. 2) of the obturator 7 is matched with that plane as it comes near the optical axis. The light-sensitive surface of the photoelectric converter 14 is not exposed to light as long as the slit 8 of the obturator 7 does not traverse the image of the heated body 30 (FIG. 1). As soon as the edge of the slit 8 (FIG. 2) reaches the edge of the image of the heated body 30, a sharp image of the aperture of the stationary field diaphragm 6 is produced on the light-sensitive surface of the photoelectric converter 14. The illuminance of this image is intensified until the whole of the slit 8 (FIG. 2) is within the confines of the image of the heated body 30 (FIG. 1). A maximum of illuminance is maintained until the slit 8 (FIG. 2) reaches the opposite edge of the image of the heated body 30 (FIG. 1); the illuminance is then reduced to total darkness. Thus a light pulse of a first train of light pulses is produced.

As a result, a trapezoidal pulse of a first train of initial electric pulses is produced at the output of the photoelectric converter 14.

As the obturator 7 continues to move, its leg 9 (FIG. 2) makes way to the luminous flux coming from the optical feedback radiation source 15 (FIG. 1) to the light-sensitive surface of the photoelectric converter 14. At first, the illuminance of the light-sensitive surface increases; then, as the obturator 7 is found at the dead point, the illuminance is for some time maintained at a constant level; finally, during the reverse movement of the obturator 7, the illuminance of the light-sensitive surface of the photoelectric converter 14 is reduced to total darkness, whereby a light pulse of a second train of light pulses is produced.

As a result, at the output of the photoelectric converter 14 there is produced a trapezoidal pulse of a second train of initial electric pulses.

Thus in the course of one complete oscillation of the obturator 7, there are produced two initial electric pulses originating from the heated body 30, and two initial electric pulses originating from the optical feedback radiation source 15. FIG. 4a shows these pulses after they are amplified by the amplifier 19 (time is plotted on the x-axis, and voltage is plotted as ordinates); the dash line shows a possible position of an amplified initial electric pulse 31 originating from the heated body 30 (FIG. 1) (further referred to as the pulse being measured) for the case the body 30 is displaced in the opposite direction with respect to the optical axis of the pyrometer. The duration of these pulses is proportional to the cross-sectional size of the heated body 30. The duration of amplified initial electric pulses 32 (FIG. 4a) originating from the optical feedback radiation source 15 (FIG. 1), which are further referred to as feedback pulses, is constant.

From the output of the amplifier 19, the two trains of pulses are applied to the input of the device 20 which operates as follows.

The two trains of pulses being measured and feedback pulses (FIG. 4a) are simultaneously applied to the synchronization and control unit 21 (FIG. 3) and to the inputs of the tap changing devices 24 and 25 which at the moment do not conduct current. The synchronization and control unit 21 (FIG. 3) converts the incoming sequences of pulses being measured and the sequences of feedback pulses (FIG. 4a) to respective trains of logic pulses shown in FIG. 4b; one of these pulses, a logic feedback pulse 33, is in phase with the a.c. line which feeds power to the vibrator 10 (FIG. 1).

Upon the arrival of the feedback pulse 32 (FIG. 4a), the synchronization and control unit 21 (FIG. 3) recognizes the corresponding logic pulse 33 (FIG. 4b) and, after a period of time equal to one half of the duration of that pulse, sends an instruction to the gate pulse forming unit 23 to form a square gate pulse 34 (FIG. 4c) of a fixed duration; this pulse is applied to the control input of the tap changing device 24 (FIG. 3); at the same time the feedback pulse 32 (FIG. 4a) is applied to the tap changing input of the device 24 and to the tap changing input of the tap changing device 25 (FIG. 3).

For a period of time equal to the fixed duration of the gate pulse 34 (FIG. 4c), the tap changing device 24 (FIG. 3) is driven into conduction, and part of the feedback pulse 32 (FIG. 4a) is passed through the tap changing device 24 (FIG. 3) to the input of the analog storage and comparison device 26 (FIG. 1). The amplitude of a square feedback pulse 35 (FIG. 4d) of a fixed duration is equal to the amplitude of the feedback pulse 32 (FIG. 4a) in its middle.

If it is the pulse 31 (FIG. 4a) being measured that is applied to the input of the synchronization and control unit 21 (FIG. 3), the corresponding logic pulse 36 (FIG. 4b) being measured is applied to the division unit 22 (FIG. 3) which uses the information on the duration of the previous logic pulse 36 (FIG. 4b) being measured and performs division with a correction for half the fixed duration of the pulses.

At a moment half the duration of the logic pulse 36 being measured expires (the aforesaid correction including), the synchronization and control unit 21 (FIG. 3) receives a signal which enables it to send an instruction to the gate pulse forming unit 23. Simultaneously, the synchronization and control unit 21 makes it possible for a gate pulse 37 (FIG. 4c) to reach the control input of the tap changing device 25 (FIG. 3) which is rendered into conduction, so that to the other input of the analog storage and comparison device 26 (FIG. 1) there is applied a square pulse 38 (FIG. 4d) being measured, which is of a fixed duration and of an amplitude equal to that of the pulse 31 (FIG. 4a) being measured.

The analog storage and comparison device 26 (FIG. 1) stores the amplitudes of the pulses of a fixed duration being measured and of the feedback pulses, which are applied to its inputs, in the form of practically constant voltage levels 39 and 40 (FIG. 4e), respectively; the amplitudes are thus stored until the arrival of the next pulses.

If the value of the square feedback pulses 35 (FIG. 4d) of a fixed duration is less than the value of the square pulses 38 being measured of a fixed duration, the analog storage and comparison device 26 (FIG. 1) increases the current through the optical feedback radiation source 15; if the value of the feedback pulses 35 (FIG. 4d) of a fixed duration is greater than the value of the pulses 38 being measured of a fixed duration, the analog storage and comparison device 26 (FIG. 1) decreases the current through the optical feedback radiation source 15; both operations are performed to an accuracy equal to the statistical error determined by the transmission coefficient of the through channel.

The current through the optical feedback radiation source 15 is unambiguously identified with the temperature of the heated body 30, so the voltage drop across the calibrated resistor, placed in series with the optical feedback radiation source 15, is reduced by the level converter 27 to a standard level (for example, 0 to 100 mV, or 0 to 1 V) and applied to the secondary redording instrument 28 which determines the response of the pyrometer as a whole; the response is about 1 second, counting from the moment the radiation of the heated body 30 reaches the pyrometer till the hand of the secondary recording instrument 28 reaches a point corresponding to 98 percent of the uppermost limit of the scale.

Without taking into account the secondary recording instrument 28, the measuring time in mode I is 0.3 to 0.7 sec, depending upon the inertia of the optical feedback radiation source 15, as well as upon the adjustment of the pyrometer.

Mode II is a fast-response mode; the switching-over to mode II is done with the aid of the switch 29. When operating in mode II, the measuring time, counting from the moment the pyrometer is receives radiation from the heated body 30, is 0.05 sec (keeping in mind that the amplitude of the first initial electric pulse originating from the heated body 30 is not measured); subsequently, it is possible to record changes in the temperature every 0.025 sec.

The switch 29 switches certain elements of the amplifier 19 (it reduces the transmission coefficient of the amplifier 19), of the analog storage and comparison device 26 (it disconnects the feedback radiation source from the output of its amplifier and brings it to the constant glow mode, which corresponds to a temperature equal to or below the lowermost limit of the pyrometer's scale), and of the level converter 27 (it switches auxiliary adjustment elements for adjusting the upper- and lowermost levels of the pyrometer's scale).

When operating in mode II, all the units of the pyrometer function basically as in mode I; the difference is that the level of the initial electric pulses originating from the optical feedback radiation source 15 is constant (it is a reference level), whereas the amplified difference between the levels of the initial electric pulses originating from the heated body 30 and the optical feedback radiation source 15 (which in this case does not provide any optical feedback), measured and reduced to a standard level, is applied to the input of the secondary recording instrument 28 or to the input of the adjustment system.

When operating in mode II, the pyrometer of the present invention is fit to be incorporated as a fast-response temperature transducer in automatic control systems.

Mode II makes the proposed pyrometer advantageous over conventional types of pyrometers based on the direct amplification principle. Mode II is advantageous in that instead of measuring absolute values of the pulses 31 (FIG. 4a) being measured, which originate from the heated body 30 (FIG. 1), one measures the difference between the amplitudes of pulses originating from the heated body 30 and the reference radiation source. As a result, the effects of changes in the sensitivity of the photoelectric converter, due to changes in the ambient temperature and the ageing of the light-sensitive surface of the photoelectric converter, upon the accuracy of measurements are markedly neutralized.

The proposed pyrometer is checked prior to installation by pressing the button 18. As this takes place, the device 20 intended for conversion of amplified initial electric pulses applies to the input of the pulsed radiation source 17 square pulses found between the feedback pulses; the pulsed radiation source converts these pulses to light pulses, thus simulating a train of light pulses arriving from the heated body. Irrespective of the operating mode (mode I or II), all the units of the pyrometer are in operation, and the recording instrument 28 indicates conventional temperature.

The technical characteristics of the proposed pyrometer are as follows:

Range of temperatures being measured:
  650°–1100° C.
  800°–1400° C.
  900°–1700° C.
Parameters of heated body spaced at minimum distance of 350 mm from pyrometer:
  wire diameter: 1.0 mm
  range of oscillation: up to 17 mm length of wire portion
  involved in measurement: 17 mm
Focal distance of objective: 135 mm
Governing error: not more than 1%
Response:
  mode I: not more than 1 sec
  mode II: 0.025 sec

What is claimed is:

1. A photoelectric pyrometer for measuring temperatures of bodies of small cross-sectional dimensions which vary with respect to the optical axis of said pyrometer, comprising:
  a housing;
  an objective secured movably in said housing, said objective being intended to pass a radiation flux emitted by a heated body and produce an image of said heated body;
  a stationary field diaphragm having an aperture and arranged in said housing behind said objective, across the path of said radiation flux, said radiation flux passing through said aperture of said stationary field diaphragm;
  a slit obturator having a slit and a leg and arranged in said housing behind said stationary field diaphragm, across the path of said radiation flux, and intended to produce a first train of light pulses as its slit scans the image of the heated body;
  an aperture diaphragm having an aperture and arranged in said housing behind said slit obturator, across the path of said first train of light pulses, which light pulses are passed through said aperture of said aperture diaphragm;
  a condenser arranged in said housing behind said aperture diaphragm, across the path of said first train of light pulses, said condenser being sighted at said aperture of said stationary field diaphragm and intended to produce a sharp pulsating-illuminance image of said aperture of said stationary field diaphragm in its sharp image plane;
  an optical feedback radiation source having an input and intended to emit a luminous flux to be converted by said leg of said obturator into a second train of light pulses;
  a photoelectric converter having a light-sensitive surface and an output, and arranged in said sharp image plane of said condenser, said light-sensitive surface receiving said first and second trains of light pulses converting said two trains of light pulses into two trains of trapezoidal electric pulses of a variable duration and on-off ratio;
  an amplifier having an input and an output, and connected with its input to said output of said photoelectric converter;
  a device for converting said amplified electric pulses into square pulses of a fixed duration and amplitudes equal to the amplitudes of said amplified electric pulses in their middles, said device having an input, a first output and a second output, and being connected with its input to said output of said amplifier;
  a storage and comparison device having a first input, a second input, a first output, and a second output, and connected with its first input and second input to said first output and second output, respectively, of said device for converting said amplified electric pulses into square pulses of a fixed duration, said storage and comparison device being electrically coupled with its first output to said input of said optical feedback radiation source;
  a secondary recording instrument having an input and electrically coupled with its input to said second output of said storage and comparison device, and intended to indicate the temperature of said heated body.

* * * * *